March 1, 1960     L. H. MORIN     2,926,485
PLASTIC TRAVELER WITH REINFORCE INSERT
Filed Feb. 27, 1958
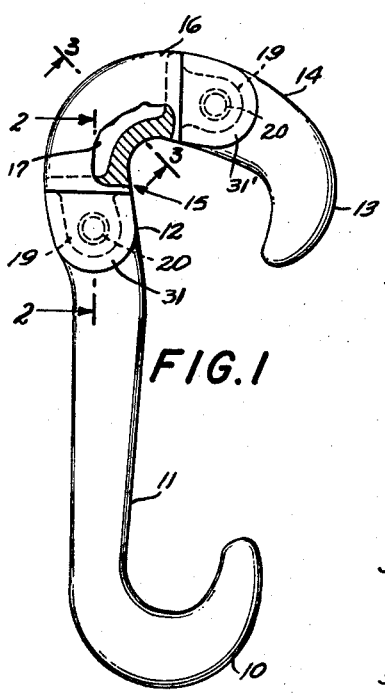
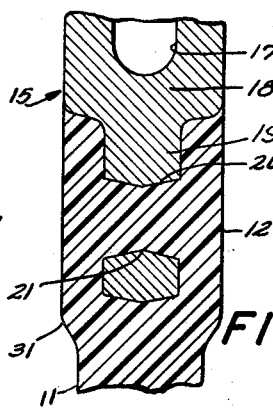
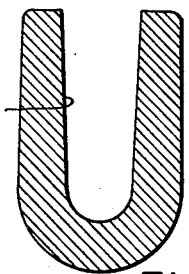
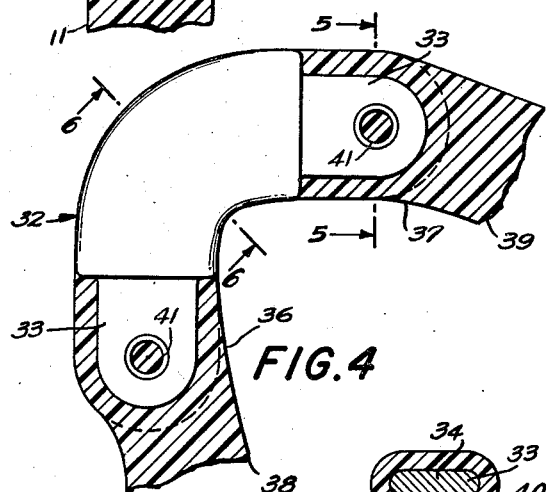
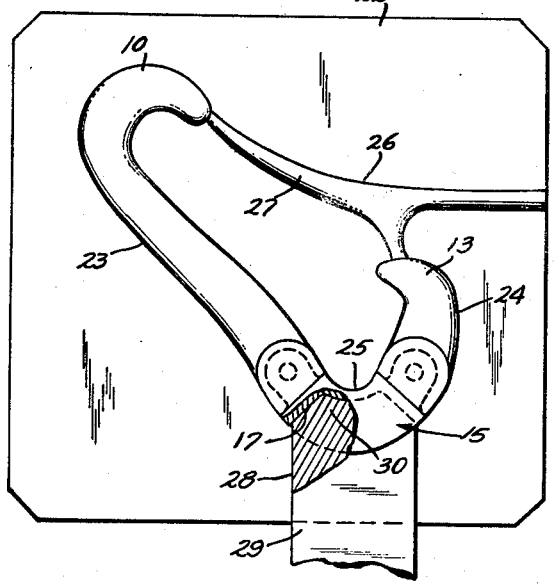
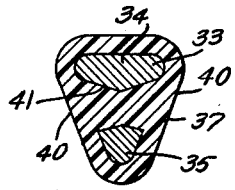
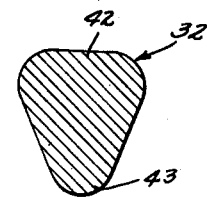
INVENTOR.
LOUIS H. MORIN
BY
*Howard E. Thompson*
ATTORNEY United States Patent Office 2,926,485
Patented Mar. 1, 1960

2,926,485
PLASTIC TRAVELER WITH REINFORCE INSERT

Louis H. Morin, Bronx, N.Y., assignor to Coats & Clark Inc., New York, N.Y., a corporation of Delaware Application February 27, 1958, Serial No. 718,012

11 Claims. (Cl. 57—125)

This invention relates to travelers formed of molded plastic material, wherein an insert of reinforcing or long wearing material bridges and spaces end portions of the plastic traveler, the insert being keyed and anchored in the plastic end portions. More particularly, the invention deals with a traveler of the character described, wherein the insert is in the form of a cast or molded element positioned in the mold cavity of the dies forming the plastic end portions on said insert.

Still more particularly, the invention deals with a product of the character described, wherein the insert includes a hollowed portion to aid in positioning and support of the insert in the dies forming the plastic ends of the traveler.

The novel features of the invention will be best understood from the following description, when taken togehter with the accompanying drawings, in which certain embodiments of the invention are disclosed and, in which, the separate parts are designated by suitable reference characters in each of the views and, in which:

Fig. 1 is a side and sectional view of one form of traveler made according to my invention.

Fig. 2 is an enlarged detail section on the line 2—2 of Fig. 1.

Fig. 3 is a section on the line 3—3 of Fig. 1, omitting all background showing.

Fig. 4 is a sectional detail view of a modified form of traveler which I employ, the view being enlarged with respect to the showing in Fig. 1.

Fig. 5 is a section on the line 5—5 of Fig. 4, omitting all background showing.

Fig. 6 is a section on the line 6—6 of Fig. 4, omitting all background showing; and Fig. 7 is a diagrammatic view illustrating the support of the insert shown in Figs. 1, 2 and 3 in a molding die and also illustrating the plastic ends of the traveler formed on the inset, part of the construction being shown in section.

In Fig. 1 of the drawing, I have shown a traveler having a hook end portion 10, with a long shank 11 with a slightly offset end 12. At 13 is shown another hook end portion having a short offset shank 14. The two hook end portions, or the shanks thereof, are joined and bridged by an insert element 15, this element being preferably in the form of a cast or molded body of any suitable tough or hard wearing material, and a ceramic element, generally known as Alsimag No. 614, can be employed. Alsimag No. 192 may also be employed, if the traveler is used for spinning nylon thread.

In the structure as shown in Figs. 1 to 3 and Fig. 7, the element 15 is in the form of a curved body 16 having a hollowed outer surface formed by a recess 17, generally of the contour illustrated in Fig. 1, this recess being also clearly shown in Figs. 2 to 3 of the drawing.

At ends of the recess 17 are wall portions 18, from which extend reduced key lugs or anchor portions 19 having apertures 20 therein. The apertures 20 are so formed as to provide central contracted portions 21, as clearly noted in Fig. 2 of the drawing.

Now, considering Fig. 7 of the drawing, at 22 is a diagrammatically shown the cavity surface of a molding die for molding the traveler ends 10 and 13 upon the insert 15, the die having a cavity portion 23 for molding the end 10, the cavity portion 24 for molding the end 13, a cavity portion 25 for reception of the insert 15 and a gate passage 26 for the sprue 27, which extends to the ends 10 and 13, respectively.

The die 22 is also fashioned to form an aperture 28 for reception of an insert supporting member 29 having an insert portion 30 shaped to fit snugly and freely within the recess 17 of the insert, as clearly illustrated in section in Fig. 7 of the drawing. It will, thus, be apparent that the member 29 will serve to definitely support the insert in position between the die halves, preparatory to forming the molded plastic ends 10 and 13 on the key lug end portions of the insert.

In addition to providing the definite support of the insert within and between the dies, it will also appear that the member 29 can be utilized in movement of the product as formed in the die 22 to a trimming station for trimming off the sprue 27 in forming the resulting end product, as illustrated in Fig. 1 of the drawing.

Considering Fig. 2 of the drawing, it will appear that the thickness of the ends 12, 14 of the traveler, the end 12 only being shown, is the same as the thickness of the insert 15, so that outer side surfaces will be in alinement with the insert, in the manner clearly illustrated in said figure.

It will also appear, however, that the terminal end portions of the shanks 11—12 and 14 are slightly enlarger, as indicated at 31, 31', respectively, these enlargements being with respect to the remainder of the shank. Here again, this is clearly illustrated in Fig. 2 of the drawing. At this time, it is also pointed out that the recess 17, in the element 15, in addition to performing the functions heretofore set forth, also serves to lighten the element 15 and the degree of this lightening can be determined by the size or dimensions of the recess 17 employed.

In Figs. 4, 5 and 6, I have shown a slight modification of the structure shown in Figs. 1, 2 and 3, wherein an insert element 32 is employed, having key lug end portions 33, generally similar to the end portions 19.

Considering Fig. 5 of the drawing, it will appear that the end portions 33 are substantially triangular in cross-sectional form with the wide portions 34 arranged at outer surfaces of the resulting traveler and the contracted portions 35 disposed on inner surfaces thereof. The terminal shanks 36, 37 of the traveler end portions 38 and 39, respectively (note Fig. 4) will also be correspondingly formed or include the inwardly contracted sides, as illustrated at 40 in Fig. 5 of the drawing, it being understood that the end portion 36 is correspondingly formed.

The lugs 33 have apertures 41, generally similar in construction to the apertures 20, as in the structure shown in Figs. 1 to 3, inclusive, the apertures 20 and 41 forming definite anchor portions for the traveler ends, as will be apparent.

Considering Fig. 6 of the drawing, it will appear that the anchor element 32 also has a substantially triangular cross-sectional contour with the wide portion 42 arranged at the outer surface thereof, the latter matching and being in alinement with the contracted portions of the molded traveler ends 36, 37, as will be apparent, so as to maintain the common surface alinement, as clearly illustrated in Fig. 2.

For purposes of description, the wear elements shown may be said to have offset end portions, which include the protruding key means or lugs, which not only retain the hook end portions against displacement from the element, but also maintain alinement of the hook end portions one with respect to the other.

With my improved method, a traveler, having where required a hard surface wearing element, can be economically produced. Further, it will appear that the molded plastic ends of the traveler which can be formed from nylon or other suitable material, are definitely anchored and keyed to the insert to become as one therewith.

Having fully described my invention, what I claim as new and desire to secure by Letters Patent:

1. A traveler of the character described, comprising molded plastic long and short shank hook end portions, said hook end portions being integrally joined in a wear element bridging and spacing the shanks of said hook end portions, and said element having offset ends including projecting key means completely embedded in said shanks in retaining the hook end portions in alinement with and against displacement from said element.

2. A structure as defined in claim 1, wherein said key means comprises apertured lugs.

3. A structure as defined in claim 2, wherein the apertures of said lugs include central contracted portions, and said shanks include enlargements adjacent said lugs.

4. A structure as defined in claim 3, wherein surfaces of the enlargements of said shanks are in alinement with surfaces of the element at end portions thereof.

5. A structure as defined in claim 4, wherein the element, intermediate its ends, is U-shaped in cross-sectional form.

6. A structure as defined in claim 4, wherein said element is substantially V-shaped in cross-sectional form.

7. A structure as defined in claim 6, wherein the lugs of said element are substantially V-shaped in cross-sectional form.

8. A structure as defined in claim 1, wherein the element, intermediate the key means, includes a hollowed portion.

9. A structure as defined in claim 1, wherein the element, including its key means, is V-shaped in cross-sectional form.

10. A traveler having plastic hook end portions molded upon protruding key means at spaced end portions of a ceramic insert, said means having flat side portions, and the contour of the key means of said insert being such as to retain the plastic hook end portions against movement in any direction with respect to said insert.

11. A structure as defined in claim 10, wherein each key means has an aperture therethrough in a direction at right angles to the plane of said traveler.

References Cited in the file of this patent

UNITED STATES PATENTS 2,749,698     Stahli                June 12, 1956